United States Patent Office

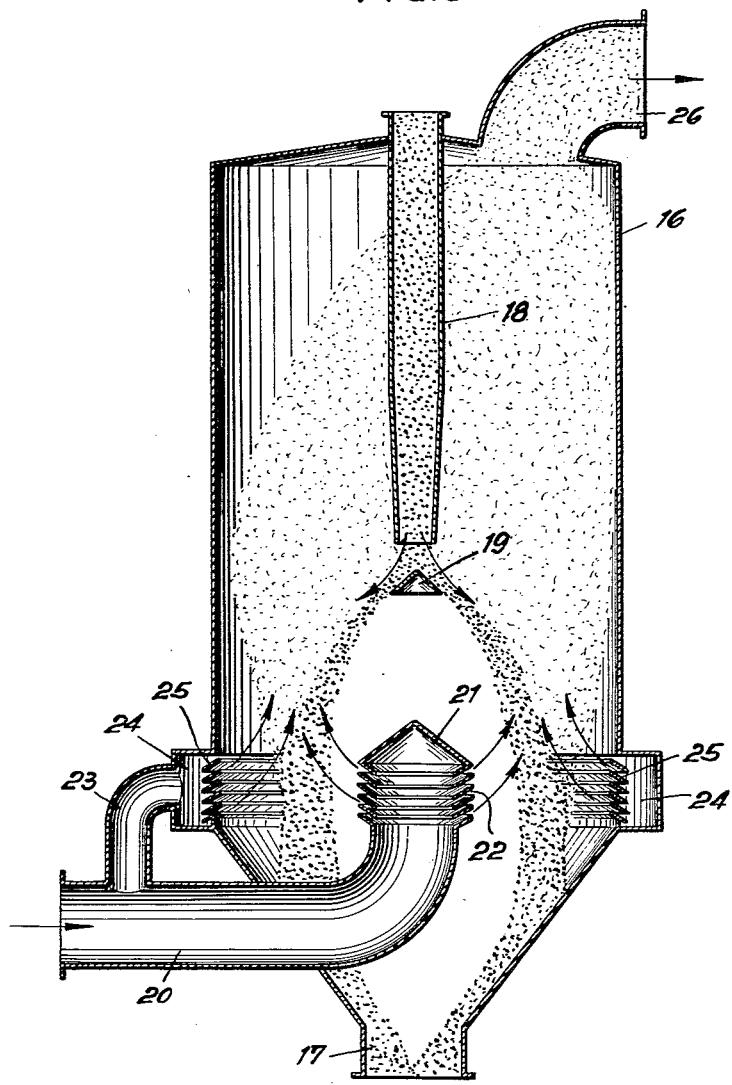

2,766,880
Patented Oct. 16, 1956

2,766,880

SEPARATION OF FINE-GRAINED PORTIONS FROM GRANULAR MATERIALS

Franz Schaub, Oberhausen-Holten, and Heinrich Tramm, Mulheim an der Ruhr Speldorf, Germany, assignors to Ruhrchemie Aktiengesellschaft, Oberhausen-Holten, Germany, a corporation of Germany Application July 29, 1952, Serial No. 301,453

Claims priority, application Germany August 4, 1951

4 Claims. (Cl. 209—138)

This invention relates to improvements in the separation of fine-grained portions from granular material. It more particularly relates to a process and apparatus for the de-dusting and particle size classification of granular materials, and especially of fertilizers.

Many chemical materials, as, for example, artificial fertilizers, which are used or marketed in granular form, must be freed from the pulverulent or fine-grained portions in order to assure uniform quality and convenient handling. Several types of processes and apparatuses were known for this separation of the fine-grained portions. None of these processes or apparatuses, however, were entirely satisfactory.

Conventional air separators operated with a recirculated air stream were prone to various operational troubles. The materials would tend to stick on these devices and could be cleaned off only with great difficulty. In addition, the mechanical devices used in air separators of this type caused an undesirable abrasion of the materials resulting in an increase of the pulverulent portions. This is particularly troublesome when working with relatively soft materials.

The conventional air separators operated with a continuous stream of fresh air and similar devices which effected the removal of the dust-like portions from the granular material by swinging the material upward through an air stream so that the coarser particles would leave the air stream more rapidly than the fine constituents also have certain drawbacks. Devices of this type require considerable space and have relatively high structural heights. If the coarser portions of the material are to be carried into the air stream in devices of this type, relatively high gas velocities are required, causing a considerable abrasion of the material and a high power consumption.

The granular mixtures may also be freed by the use of eddying of gas or air streams. This method effects a good selectivity in the classification, but the trough-put capacities are so low that the process is uneconomical, especially for the processing of bulk goods such as artificial fertilizers when taking into account the high cost of the initial equipment required. In addition, there is also the danger of too high an abrasion of the material, due to the high gas velocity used.

Figure 1:
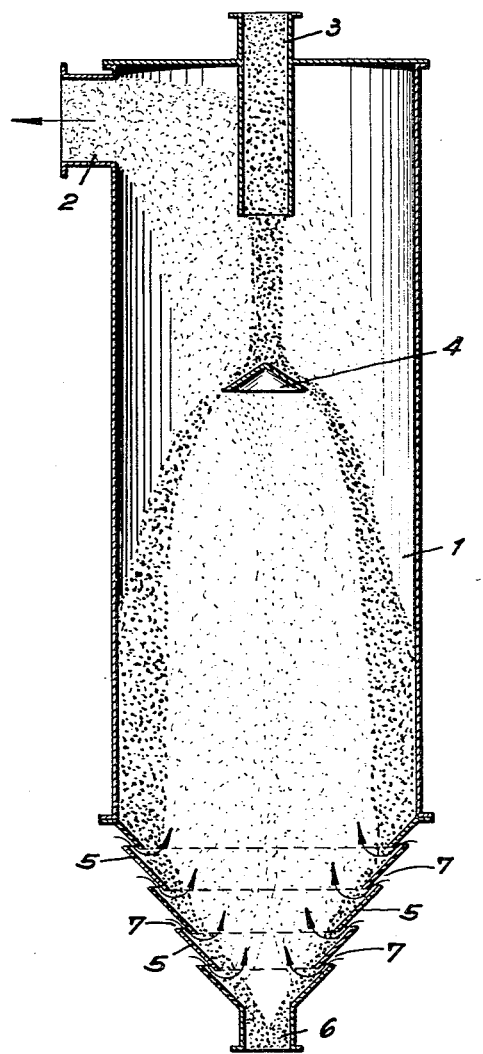
Figure 2:
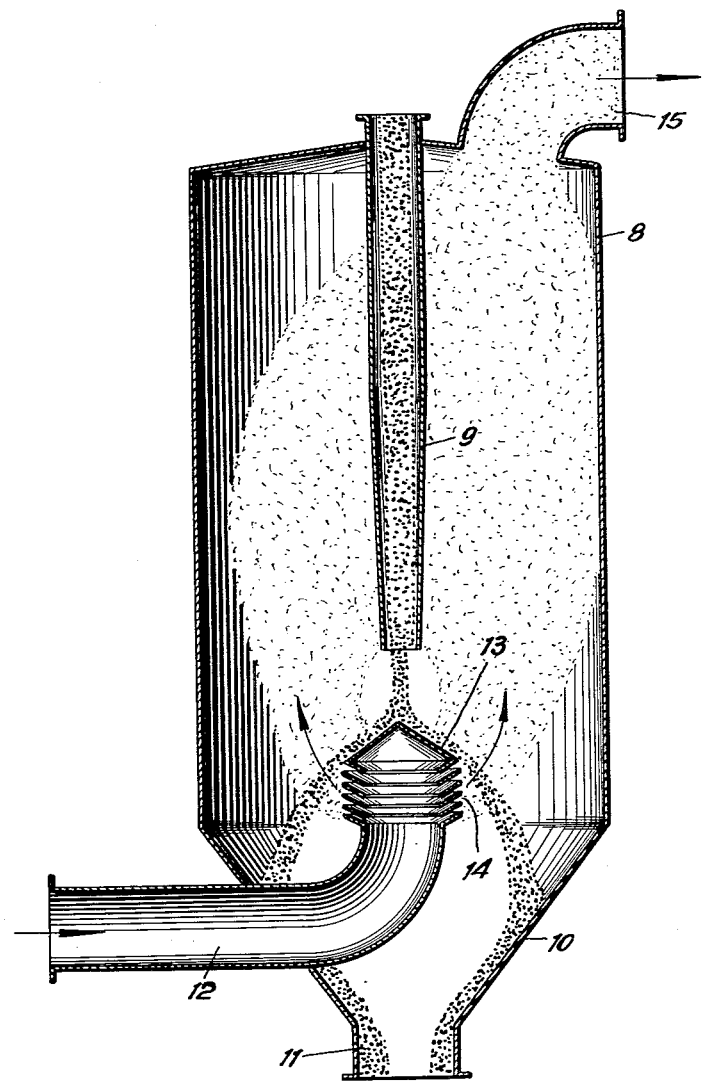

One object of this invention is the separation of the fine-grained portions from granular material in a simple economical manner without the above-mentioned disadvantages. This, and still further objects will become apparent from the following description read in conjunction with the drawings, in which Fig. 1 shows a vertical section of an apparatus for effecting the process in accordance with the invention;

Fig. 2 shows a vertical section of another embodiment for effecting the process in accordance with the invention; and Fig. 3 shows a vertical section of still another embodiment for effecting the process in accordance with the invention.

In accordance with the invention, the granular material is passed downward through a separation zone in a widely spread stream. A gas stream is passed upward in counter-current flow through the granular material, through the zone, at a relatively low flow velocity. The pulverulent and fine-grained portions of the granular material are carried along with the upwardly rising gas stream and discharged. After having left the separation zone, these portions may be separated from the gas stream by dust separators in the conventional manner and withdrawn. The gas stream may be recycled through the separation zone. If necessary or desired, the gas stream may be heated, dried, or otherwise treated before being recycled. In order for the granular material to be passed downwardly through the separation zone in a widely spread stream, it is first conducted over a distribution device positioned in the upper portion of the zone. The separation zone may be defined by any vertical shaft or vessel of any desirable and preferably round cross-section. The gas stream is allowed to rise at a relatively low velocity through this vessel or shaft. Between the device for distributing the material into a widely spread stream into the upwardly rising gas stream and the point where the gases leave the separation zone, an adequate space is preferably provided for the supplementary separation of any entrained over-sized particles by the action of gravity. The material to be processed in accordance with the invention must in some degree be uniformly distributed over the cross-section of the separation zone, which, for example, may be defined by a shaft or vessel of round cross-section. Thus the material will be uniformly distributed over the rising gas stream. Under these conditions the rising gas stream can contact the falling material from all sides and free it from the pulverulent portions or undersized grains. The upper limit of the grain size which are separated, is substantially dependent on the velocity of the rising air stream. An additional separation or classification of the material may be obtained by conducting the air stream which is injected or sucked through the separation zone through grid surfaces disposed at the lower end of the zone and over which the material is conducted out of the zone. These grid surfaces are preferably arranged at an angle steep enough, so that the material being processed will not form stationary layers thereon. Thus the grid surfaces should preferably be arranged at least as steep as the natural angle of repose of the material being processed.

The distribution of the granular material over the cross-section of the rising gas stream within the separation zone may be effected by fixed, conically shaped plates. These plates may be provided with slightly spiral guide surface. In addition, a centrifugal action may be used for the distribution of the material by imparting the distribution plates a rotating motion at a predetermined peripheral velocity.

The gases may be blown in through centrally arranged louvered nozzles. It is, however, also possible to use ring-like arranged slots, perforated plates or nozzles for the blowing in of the gases. Embodiments of devices which are suitable for effecting the process will be described in further detail with reference to the drawings.

In Fig. 1, 1 is a vertical cylindrical vessel which terminates in a downwardly tapering extension and is connected by the pipe connection 2 to a suction fan of adequate capacity. The granular material to be freed from dust, such as granulated calcium ammonium nitrate, is continuously charged through a feed pipe 3. The material drops down in a widely spread stream over the distribution plate 4, which, if necessary or desired, is rotated by an electric motor. Then it passes over the conically arranged bottom plates 5 which partly overlap one another, and to an opening 6, through which it is continuously or batchwisely discharged. The successive plates 5 leave between one another slots through which air or other gases flow in at an adequate velocity. The air injection may be effected by the suction device acting at the nozzle 2 and/or by a blower acting upon a shell space surrounding the plates 5.

The removal of dust from the material occurs chiefly in a rising air stream which passes through the granular material falling down from the distribution plate 4. Moreover, pulverulent portions may be entrained and carried away by the gas stream before the material discharge, while the material is sliding down over the plate 5.

According to Fig. 2, a vertical vessel 8 of any cross-section is used, to which the material to be freed from dust is admitted through an axially arranged pipe 9. At the lower end, the vessel 8 is provided with a funnel-shaped bottom 10, which terminates in the discharge opening 11. From the side, a blast pipe 12 extends horizontally into the conical bottom and is upwardly bent in the center of the vessel at a right angle. The blast pipe 12 is closed by a cone-shaped cap 13. Below the cap the pipe is provided with annular slots 14 through which air is blown in. The rising air stream passes through the material sliding down over the cap 13, thereby whirling it up and lifting it into the empty upper space of the vessel 8. Here the coarse-grained portions of the material have sufficient opportunity to fall down before the gaseous medium leaves the vessel 8 at a relatively low velocity through the pipe 15 of large diameter. The coarse-grained portions falling down from the gas stream slide down over the walls of the funnel 10 onto the discharge opening 11. Similar to the arrangement shown in Fig. 1, the surface of the funnel 10 may be provided with slots which partly overlap one another and through which an additional side stream of gas is admitted which effects the removal of any dust portions still present in the material.

The device shown in Fig. 3 comprises a vertical vessel 16 of round or polygonal cross-section, the bottom of which has the shape of a funnel and terminates in the discharge opening 17. The material to be freed from dust is charged through an axially arranged pipe 18. First of all, the material passes onto the distribution cone 19 by which it is spread as widely as possible over the cross-section of the vessel. Fins disposed on the surface of the cone 19 may aid in spreading the material.

An air stream is blown in through a pipe 20 extending from the side into the conical bottom and upwardly bent at a right angle in the center of the vessel 16. At its upper end the pipe 20 has several superimposed annular slots 22 and is closed by a conical surface 21. The vessel 16 is surrounded at the lower end of its cylindrical part by an annular channel 24, the inner surface of which consists of louvered slots 25. A branch line 23 leads from the gas pipe 20 to the annular channel 24, thus permitting a gas stream of adequate but not too high velocity to be blown into the container 16 from the inside as well as from the periphery of the same. The gaseous medium rises in upward direction and leaves the vessel through a pipe 26 of large diameter. In this way an intimate contact is effected between the rising gas streams and the material falling down and widely spread by the cone 19. The fine-grained and pulverulent portions of the material are carried along by these gas streams onto the gas outlet 26 while a granular material freed from dust as prescribed may be withdrawn from the discharge opening 17.

The apparatus according to the invention permits the freeing of large quantities of material from dust and fine-grained portions with an adequate selectivity and in a relatively very small space. Nevertheless, the apparatus is of very simple construction; it has no moving parts and may be cleaned in a most simple way. Due to the low gas velocity, the treatment of the material is a very careful one and practically no additional abrasion is caused by the apparatus.

Using a vessel of 600 mm. diameter and about 2 m. height constructed in accordance with the invention, 10,000–20,000 kilos/hr. of calcium ammonium nitrate were freed from dust and all portions the grain size of which was below 0.5 mm. For this purpose, less than 3,00 m.³/hr. of air were required, which suffered a pressure drop of only about 30 mm. water column, while passing through the apparatus.

The process and the apparatus in accordance with the invention may largely be modified within the scope of the idea of the invention. The quantities of air and gas used for the dust removal and the classification may be injected or sucked into the apparatus. The gaseous media must flow in at the various points of the apparatus in such a manner as to bring the material falling down as intimately as possible and in the form of individual grains into contact with the rising gas stream. In most cases, such as in the treatment of fertilizers, the gaseous medium consists of air which is heated and dried as far as possible before being passed into the vessel in order to reduce the moisture content of the material. Also pre-cooled air may be used if fertilizers or other chemical materials leaving the manufacturing process in the hot state are to be cooled.

When granular materials are treated which are sensitive to air, then inert gases, such as nitrogen, carbon dioxide or combustion gases, are used as the gaseous medium. This is done, for example, if sensitive catalysts, such as catalysts for carbon monoxide hydrogenation, are to be freed from pulverulent portions or undersized grains.

If a high selectivity or a particularly careful dust removal is required, receptacles having a conical widening towards the bottom may be used rather than cylindrical vessels. In any case, the velocity of the injected or sucked-in gases must be adapted to the separating effect desired. A small quantity of material may be maintained or allowed to accumulate at the material discharge by correspondingly proportioning or adjusting the discharge cross-section in order to prevent disturbing gases from being sucked in at this point.

In addition to fertilizers, many other materials may be freed from dust by means of the process according to the invention. Such materials are, for example, sand grains, minerals, coal, salts, ores, fruits and seeds. There is no upper limit for the grain size of the materials to be freed from dust; however, it is of advantage not to exceed a grain size of 5 cm. The quantity of material falling onto the dedusting air stream is dependent upon the layer depth which the material has as it leaves the border of the distribution plate (4, 13, 19). This layer depth may be adjusted by the slope of the distribution plate used and by means of the quantity of material entering through the feed pipe (3, 9, 18) per unit of time.

We claim:

1. In an apparatus for the removal of dust and fine-grained portions from granular materials, having a substantially vertical shaft conically narrowing at the bottom thereof to define a granular material discharge opening, a granular material inlet pipe of substantially smaller diameter than the diameter of said shaft centrally positioned through the top of said shaft, a stationary distribution cone centrally positioned in said shaft below said inlet pipe and means defining a gas and fine-grained granular material outlet at the upper portion of said shaft, the improvement which comprises upwardly sloping, spaced-apart louver plates rigidly positioned in a vertical, cylindrical arrangement substantially immediately below said distribution cone and spaced inwardly from the wall of said shaft defining gas-inlet slots for passing a gas stream into said shaft.

2. Improvement according to claim 1 in which said conically narrowing bottom of said shaft is defined by downwardly sloping spaced-apart louver plates.

3. Improvement according to claim 1 which includes a gas inlet pipe extending into the lower portion of said shaft and bending upwardly in the central portion of said shaft, said distribution cone being positioned at the top of said gas inlet pipe, and said upwardly sloping spaced-apart louver plates being defined through said gas inlet pipe below said distribution cone.

4. Improvement according to claim 1 which includes a gas inlet pipe extending into said shaft, bent in an upward direction at the central portion of said shaft and provided with said louver plates at its upper end and which includes an annular channel positioned about the lower portion of said shaft, gas inlet slots defined through said shaft into said annular channel and means for passing a gas stream to said annular channel.

References Cited in the file of this patent

UNITED STATES PATENTS

| | | |
|---|---|---|
| 940,469 | Middleton | Nov. 16, 1909 |
| 1,522,151 | Stebbins | Jan. 6, 1925 |
| 1,569,468 | Ely | Jan. 12, 1926 |
| 2,421,840 | Lechthaler | June 10, 1947 |
| 2,446,786 | Redhead | Aug. 10, 1948 |

FOREIGN PATENTS

| | | |
|---|---|---|
| 1,455 | Great Britain | of 1885 |
| 295,828 | Germany | Dec. 21, 1916 |
| 346,574 | Germany | Jan. 2, 1922 |
| 453,358 | Germany | Dec. 5, 1927 |
| 464,928 | France | Jan. 24, 1914 |